United States Patent Office 3,242,159
Patented Mar. 22, 1966

3,242,159
TREATMENT OF LINEAR POLYETHYLENE
Herman S. Kaufman, Teaneck, N.J., assignor to Pullman Incorporated, a corporation of Delaware
No Drawing. Filed Nov. 27, 1961, Ser. No. 155,201
7 Claims. (Cl. 260—94.9)

This application is a continuation-in-part of application Serial No. 631,076, filed December 28, 1956, now abandoned.

This invention relates to an improved method of cross-linking a linear polyethylene and to the improved product produced thereby. In one aspect this invention relates to a cross-linked product of a linear polyethylene having improved zero strength time (ZST). Another aspect of this invention relates to a cross-linked product of a linear polyethylene of high tensile strength having a greatly improved percent elongation and reduced stress cracking. Still another aspect of this invention relates to a flexible cross-linked product of a linear polyethylene which can be molded in any desired shape and still maintain its initial density and high temperature stability and a method for producing the flexible product.

Linear and branch chain polyethylenes are among the most widely used polymers in industry. Of these two types, linear polyethylene is the most recently developed. Its introduction for commercial use has found immediate application and the market for this unusual linear polymer has experienced ever increasing demands, particularly in applications which require a high degree of thermal stability such as that encountered in sterilization processes. Until the advent of linear polyethylene, the polymer of ethylene could not be used for manufactured articles which would be subjected to elevated temperatures for sterilization or other purposes. The branch chain polymer is deformed at temperatures of about 90° C. and melts at temperatures of about 120° C. In addition to this deficiency, branch chain polyethylene lacks the strength and toughness of the more rigid linear polymer. Other chemical and physical properties of these two types of ethylene polymer differ so markedly that it is impossible to predict, with any certainty, the chemical behavior of one based on the performance of the other. For this reason linear polyethylene is not a substitute for the branch chain type but rather a complementary polymer; which, because of its difference in properties for example, high temperature stability, high density, good impact properties at temperatures as low as −78° C., toughness, extremely low permeability, etc., enable it to be used in applications for which branch chain polyethylene is unsuitable.

The most distinguishing characteristics of these two polymers is the flexibility and low melting point of the relatively soluble branch chain variety as compared with the non-flexibility and high temperature stability of the linear relatively insoluble polymer. The stiffness modulus of linear polyethylene is in the order of about 50,000 to 100,000 whereas branch chain polyethylene is about 19,000. Many researchers have tried to produce a polyethylene having the high density and heat stability of the linear type, but which is modified in that it is rendered flexible. Accordingly, additives which impart elastomeric characteristics, e.g., Alon 1, isoprene, etc., have been incorporated into linear polyethylene compositions and various copolymerizations of linear polyethylene with rubbery comonomers have been suggested in an attempt to produce a flexible product retaining other characteristics of the linear polyethylene such as high density and temperature stability. These methods, however, have not been successful, for while some degree of flexibility is imparted to the product, it has not been possible to retain the high density and/or high temperature stability due to the effect of the additives. Furthermore, various additives and fillers such as, for example aerosol and calcium silicate, in addition to having a degrading effect on the temperature stability and density of the polymer, also affect the high chemical resistance normally associated with linear polyethylene.

Certain other shortcomings peculiar to linear polyethylene have been reported. For example, one of the foremost problems is that of shrinkage, which is troublesome when molding linear polyethylene into articles for use in high temperature apparatus or for uses which require high abrasion resistance. This problem does not apply to the branch chain polymer. Another problem of major importance is the tendency of linear polyethylene to fracture under impact owing to its characteristic brittleness. This problem is also absent from the fabrication of the branch chain polymer, which is characteristically flexible. No attempt has been made to solve this problem.

While the tensile strength of linear polyethylene is fairly high, e.g., between about 2,000 p.s.i.g. and about 3,000 p.s.i.g. and the percent elongation is between about 500 and about 700, it is known that certain treatments, such as irradiation, cause a marked decrease in these properties. It is highly desirable to improve these properties to a point where commercial piping under pressure can be fabricated from this relatively inexpensive, chemically-resistant polymer. Heretofore, no method has been devised which will retain, much less increase, the tensile strength and percent elongation of the original linear polyethylene. Additives have been suggested, but they have only served to minimize the degradation of these properties in the polymer during treatment.

In spite of the many valuable properties of linear polyethylene as compared with branch chain polyethylene, the linear polymer fails to meet requirements in certain applications which demand high ZST, high density and low shrinkage in molding applications. Although one experiences considerably less shrinkage when molding linear polyethylene as compared with branch chain polyethylene, there is a need to reduce this factor even further so that little if any shrinkage is apparent. For this reason a method of treating linear polyethylene which would remove the present difficulties is needed.

It is, therefore, an object of the present invention to provide a cross-linked linear polyethylene of improved properties and a method for the preparation thereof.

Another object of this invention is to provide a moldable cross-linked linear polyethylene having improved ZST.

Another object of this invention is to provide a cross-linked linear polyethylene having a percent elongation greater than that of the original polymer prior to cross-linking.

Another object of this invention is to provide a cross-linked linear polyethylene having improved tensile strength with respect to the original linear polyethylene prior to cross-linking.

Another object of this invention is to provide a cross-linked linear polyethylene which can be molded into a variety of useful articles of manufacture without a considerable amount of shrinkage.

Another object is to provide a unique cross-linked linear polyethylene which is flexible and which does not melt at temperatures up to 260° C.

Another object is to provide a cross-linked linear polyethylene having increased percent elongation, tensile strength, and heat stability with respect to the original polymer while still retaining the high density of the original polymer.

Still another object of this invention is to provide a commercially feasible method of cross-linking a linear polyethylene to obtain a polymer having the above improved properties.

Other objects and advantages of the present invention will become apparent to those skilled in the art from the accompanying description and disclosure.

According to this invention normally solid polyethylene having a density of between 0.93 g./cc. and about 0.97 g./cc.[1] is reacted with a compound containing an O—O linkage such as, for example, an organic peroxy compound to produce a cross-link polymer having improved properties. A critical amount of the peroxy compound which serves as a cross-linking or vulanizing agent is admixed with the linear polyethylene and is permitted to cross-link within a critical temperature range. For the purposes of this invention, the cross-linking agent is a compound having two successive oxygen atoms directly bonded to each other.

The cross-linking agents which are used in accordance with this invention are the organic and inorganic types containing between 0 and 30 carbon atoms. Suitable cross-linking agents of this invention are the organic peroxy compounds containing between 4 and 24 carbon atoms and a peroxide linkage, i.e., —O—O—. Thus, the general formula of the organic cross-linking agents suitably employed is $$A—O—O—B \qquad (1)$$

wherein each of the substituents A and B is a hydrocarbon or carbonyl hydrocarbon radical or wherein B is a hydrogen atom when A is a carbonyl hydrocarbon radical.

Examples of suitable cross-linking agents which are usefully employed in the process of this invention are diethyl peroxide, diacetyl peroxide, dicrotonyl peroxide, di-tert-butyl peroxide, dibenzoyl peroxide, cumyl peroxide, dilauryl peroxide, perbenzoic acid, peracetic acid, tert-butyl perbenzoate, iso-propyl perbenzoate, monoperphthalic acid, perbutyric acid, monopersuccinic acid, diperterephthalic acid, percinnamic acid, di-tert-butyl diperphthalate, dimethyldiperphthalate, trans-decalylperbenzoate, tert-butyl peracetate. Preferred of this group are the organic peroxy compounds which have boiling points between about 125° C. and about 300° C. and contain between 4 and 24 carbon atoms and a peroxide linkage.

Other peroxy compounds which are suitably employed in the process of this invention for treating linear polyethylene include ozone, organic hydroperoxides such as, for example, tert-butyl hydroperoxide, cumene hydroperoxide, cylohexyl hydroperoxide, diphenylmethyl hydroperoxide, isopropyl hydroperoxide, and inorganic peroxides such as, for example, hydrogen peroxide, barium peroxide, rubidium peroxide, cesium peroxide, cadmium peroxide, potassium peroxide, magnesium peroxide, potassium superoxide, cesium superoxide, potassium peroxide-superoxide, etc.

Oxygen is also a suitable cross-linking agent in a process of the present invention and can be used to produce a unique product which is flexible and retains the high density of the original polymer. It is to be understood that air or oxygen-enriched air can also be used in the process involving oxygen as hereinafter described.

The normally solid ethylene polymer of this invention is a linear polymer produced by the low pressure polymerization of a hydrocarbon olefin such as ethylene, propylene and butylene or a polyethylene having a density between 0.93 and 0.97 g./cc. The low pressure polymerization are carried out at pressures not exceeding 30,000 p.s.i.g. and are usually effected between about atmospheric pressure and about 10,000 p.s.i.g. For example, ---
[1] Modern Plastics 33/#1/185–210/55.

the method of Ziegler is reported in Industrial and Engineering Chemistry, volume #4, page 12A, April, 1955, and in British Patent Patent No. 713,081; the method of Phillips Petroleum Company is reported in Australian Patent No. 864/54 and U.S. Patent No. 2,606,940.

The linear polyethylene employed in this invention ranges from a hard wax to a plastic and may contain methyl substituents along the polymer chain as in the methyl substituted polyethylenes obtained by low pressure techniques from the polymerization of propylene or butylene or by the copolymerization of ethylene and propylene, ethylene and butylene or propylene and butylene. Of the normally solid linear polyethylenes which may be used in the present cross-linking process, the unsubstituted plastic ethylene polymer is preferred. This unsubstituted plastic linear polymer of ethylene has a molecular weight of between about 50,000 and about 100,000. It is imperative that linear polyethylene be employed in the present process, since cross-linking of branched chain polyethylene with the above mentioned cross-linking agents would result in an entirely different product having vastly different physical and chemical properties and which would be unsuitable for the applications claimed for the product of this invention such as, for example, the manufacture of sterilizable articles, wire coating, pipes, tubes and filaments of high density, etc.

The cross-linked polymeric product of this invention shows improved and unexpected properties as compared with the uncross-linked linear polyethylene. Cross-linking of branched chain polyethylene by irradiation results in decrease of tensile strength and drastic reduction in percent elongation as reported in Journal of Polymer Science, vol. 13/410–411/54, and the Encyclopedia of Chemical Technology, First Supplement, page 703. Cross-linking of branched chain polyethylene with organic peroxides results in a marked decrease in density in addition to the decrease in percent elongation and tensile strength (U.S. Patent No. 2,826,570). Therefore, the fact that the cross-linked polyethylene product of the present process results in an increased percent elongation and tensile strength and retains the same density of the original polymer, is an important and astonishing discovery. But it is found that these unique products can be produced by cross-linking only when operating within the critical limits set forth in the following description of the process.

The ZST of the present products also shows a marked increase whereas stress cracking in a given time and creep has been greatly decreased. At the ZST values obtained in the cross-linked polymer, for example, about 600, fabrication of this polymer is guaranteed.

The ZST of polymeric cross-linked material is determined by placing a notched 2 x 3/16 x 1/8 inch sample or strip of the material in an upright position in an oven. The strip is attached at a lower end notch to a weight and the whole is suspended by a clamp or holder located at the top and attached to an upper end notch of the strip. The temperature of the oven is controlled at a temperature above the melting temperature of polyethylene and ZST (zero strength time) is recorded, as the time in seconds which are required before the sample breaks under the downward pressure exerted by the attached weight. The general method of determining ZST can be found in the ASTM Standards for chlorotrifluoroethylene polymers.

According to the cross-linking process of the present invention for improving the ZST and reducing stress cracking in the product less than about 10 weight percent, preferably between about 0.05 weight percent and about 2 weight percent of the peroxy cross-linking agent is employed with every 100 weight percent of polymer. When amounts in excess of 10 weight percent of the peroxy cross-linking agent are employed, the moldability of the resulting cross-linked polymer is decreased; below about 0.01 weight percent of the peroxy cross-linking agent, the ZST is not sufficiently enhanced to render an improved polymeric product. For increased percent elongation in the product of the present invention, less than about 5 weight percent of the peroxy cross-linking agent is used. Therefore, for the concentration of the cross-linking agent employed in the present process is critical in the achievement of products possessing certain properties.

The cross-linking agent is added to the linear polymer at a temperature of between about 20° C. and about 150° C. and is thoroughly mixed therewith for a period of about 0.5 to about 5 hours. This mixture can be cured immediately or can be stored for a period and then cured. The curing process with peroxy compounds comprises pressing the polymer while allowing the cross-linking to take place at a critical cure temperature of between about 175° C. and about 255° C., preferably between 175° C. and 225° C., for a period of from about a few minutes to several days. When employing the aforementioned preferred organic peroxy compounds as cross-linking agents, the cross-linking usually occurs within a period of from about 5 minutes to about one hour. However, when employing some of the alternative cross-linking agents described above, for example, oxygen gas, the cross-linking may be carried out at a lower temperature, e.g., about 150° C. and may require a period of 2 to 3 days or more. When cross-linking with oxygen to obtain the flexible product of the present invention, cross-linking is carried out above the polymer transition temperature, which can be lower than 150° C.; thus, for example, cross-linking with oxygen can be carried out at between about 145° C. and about 160° C. in certain cases. This method of cross-linking, however, is preceded by a preheating step which is not required when cross-linking with the peroxy compounds.

In cases where the desired amount of cross-linking has not taken place in a single pressing operation, the cross-linked polymeric material can be repressed to induce further cross-linking and reach the desired ZST. This phenomenon presents some advantages over other cross-linking techniques in that the polymer can be molded after a degree of cross-linking has taken place. Heretofore, polymers have been molded during the cross-linking reaction, for the cross-linking reaction in prior operations has proceeded so rapidly that the polymer "sets-up" and is not moldable thereafter.

The fact that by the process of this invention the cross-linking can be halted after the first pressing permits the partially cross-linked polymer having improved ZST, tensile strength, percent elongation and other improved properties to be shipped in a convenient form, e.g., pellets, to the user who can then complete the cross-linking process in a mold or die and thus stabilize the cross-linking reaction at the desired ZST at the molding plant. Thus, improved economy and efficiency in the overall manufacture of products from linear polyethylene is realized.

When a plastic polyethylene is employed it is preferably obtained in a finely divided state before mixing with the peroxy cross-linking agent. This state is also desirable when cross-linking with oxygen. For example, the plastic polyethylene particles should be in the form of a fine powder, 95 percent of which will pass through a number 50 sieve, most preferably through a number 200 sieve in the U.S. Bureau of Standards Series.

A convenient method of adding the peroxy cross-linking agent to the polymer comprises taking an aliquot sample of the linear polyethylene and mixing therewith the desired amount of cross-linking agent. This mixture is then added to the remaining portion of polymer and thoroughly mixed to give the final concentration before curing.

Another method of obtaining uniform distribution of the peroxy compound in the polymer comprises mixing the solid or liquid peroxy cross-linking agent, which, if desired, may be dissolved in a solvent or suspended in a diluent, with a solution or suspension of the linear polyethylene. Suitable solvents for this purpose are the organic solvents boiling below about 300° C., preferably below 225° C., in which the ingredients are soluble such as, for example, benzene, xylene, toluene, cyclohexane, etc. When a solution is employed, the ratio of solvent to each of the ingredients, i.e. polymer and cross-linking agent, is between about 0.25:1 and about 5:1 or more of solvent, if desired.

Still another method for thoroughly mixing the peroxy cross-linking agent with the polymer comprises maintaining the peroxide in the vapor state by means of a partial vacuum in a chamber containing the peroxy cross-linking agent and passing finely divided polyethylene at room temperature (about 25±5° C.) or lower through the chamber. The peroxy compound which condenses on the surface of the polymer will be evenly distributed thereon.

The degree of cross-linking in the polymer can be controlled by adjusting the concentration of the peroxy compound, time and temperature conditions of the reaction so that within the above limits the polymer is permitted to cross-link until the desired ZST is reached. A ZST (at 250° C.) of 4,000 or more can be attained, however, above about 1,000 the moldability of the polymer begins to decline. In some applications such as compression molding of manufactured articles which are to be subjected to elevated temperatures, the higher ZST is of prime importance, however, in other applications such as extrusion molding, this may be a disadvantage. For purposes of molding, tests in these laboratories have shown that for extrusion molding a ZST of between about 150 and about 250 is the most desirable. For injection molding a ZST of 1,000 or less is desirable and a ZST between about 400 and about 600 is preferred. Compression molding is satisfactorily carried out at any ZST above about 200 and preferably not above 2,000.

In the present cross-linking process of this invention, anti-oxidants may be added to the mixture of polymer and cross-linking agent before curing. Suitable anti-oxidants which include Ionol (2-6 di-tert-butyl-4-methyl phenol), Agerite (sym-dibeta-naphthyl para-phenylenediamine), Santowhite crystals (4,4'-thio-bis-(6-tert-butyl-m-cresol) and others can be added in an amount between about 0.01 weight percent and about 0.1 weight percent for each 100 weight percent of polymer. Other additives such as fillers, e.g. alumina, carbon black, silica, are avoided in the cross-linking mixture as they serve to degrade the desirable properties of the polymer and result in lowering the percent elongation in the product.

The method of cross-linking polyethylene with oxygen or air is somewhat different than that of peroxy cross-linking. With oxygen, or the oxygen containing gas, the polymer is heated to different temperature levels in an atmosphere of the gas.

The cross-linking phenomenon of the polymer is observed when linear polyethylene is heated in an atmosphere of air or oxygen at a temperature between about 100° C. and about 145° C., but below the transition temperature. This results in a brittle polymer. When, however, this material is heated above its transition temperature (for Marlex 50 above about 150° C.), the material is no longer brittle and has increased ZST and is flexible. This material is now considerably more heat stable as far as embrittlement is concerned, retains a high density, which is characteristic of the linear polymer, and can be flexed by hand.

The following examples are offered as a better understanding of the present invention and are not to be construed as unnecessarily limiting thereto.

EXAMPLE 1

To about 25 grams of unsubstituted linear plastic polyethylene powder was added 0.075 gram of tert-butylperbenzoate and the two ingredients were intimately mixed in a blender. The resulting mixture was then added to 75 grams of linear plastic polyethylene powder and thoroughly mixed therewith so that 100 grams of polyethylene containing 0.075 gram of uniformly distributed t-butyl perbenzoate was obtained.

A portion of this uncross-linked material, having a ZST at 250° C. of 64 was heated and compression molded at 175° C. up to 200° C. under 10,000 p.s.i.g. for ten minutes. The ZST at 250° C. of the resulting partially cross-linked material had a value of 140. This material was then remolded by again subjecting it to a pressure of 10,000 p.s.i.g. at 175° C. to 200° C. for another ten minutes and the ZST was increased and stabilized at 214.

The molded sheet showed excellent resistance to abrasion and to the action of corrosive gases and detergents. The tensile strength was improved and the percent elongation was greatly increased over that of the original polymer.

set forth in Example 1 employing 100 weight percent of unsubstituted linear plastic polyethylene powder having a density of 0.96 g./cc. Examples 3 and 7 are blank runs on 100 grams of unsubstituted linear plastic polyethylene powder and are presented for comparison purposes.

Table I

| Example | Polyethylene Sample | Weight percent di-t-butyl Peroxide | Weight percent t-butyl Perbenzoate | ZST at 160° C. | | Percent Elongation | Tensile Strength, p.s.i.g. | Density |
|---|---|---|---|---|---|---|---|---|
| | | | | First Press at 200° C. | Second Press at 200° C. | | | |
| 3 | A | | | 250 | 240 | 500 | 2,550 | 0.96 |
| 4 | A | 0.05 | | 269 | 275 | 620 | 3,260 | 0.96 |
| 5 | A | 0.20 | | 303 | 673 | 700 | 3,900 | 0.96 |
| 6 | A | 0.50 | | 3,100 | | 595 | 4,270 | 0.95 |
| 7 | B | | | 234 | 227 | 655 | 2,870 | |
| 8 | B | 0.05 | | 251 | 247 | 835 | 3,675 | |
| 9 | B | 0.10 | | 253 | 251 | 660 | 3,240 | |
| 10 | B | 0.15 | | 276 | 248 | 620 | 3,200 | |
| 11 | B | 0.20 | | 478 | 873 | 710 | 3,790 | |
| 12 | B | | 0.05 | 488 | 1,160 | | | |
| 13 | B | | 0.10 | 1,000 | | | | |

The ZST of the cross-linked material in the following examples shown in Table II was determined. Only in a few cases did the sample fail at 160° C. under a weight of 7.5 grams. For this reason, a weight of 20 grams was tested at 160° C. and a weight of 7.5 grams at 250° C. was also tried in an attempt to determine the time of failure. In each case, 100 weight percent of Marlex 50, a plastic linear polyethylene having a density of 0.96 g./cc., was used.

Table II

| Example | Polyethylene Sample | Weight percent di-t-butyl Peroxide | Weight percent t-butyl Perbenzoate | ZST | | |
|---|---|---|---|---|---|---|
| | | | | 160° C., 7.5 g. weight | 160° C., 20 g. weight | 250° C., 7.5 g. weight |
| 14 | B | | | 234 | 206 | 55 |
| 15 | B | 0.05 | | | 214 | 64 |
| 16 | B | 0.10 | | | 232 | 68 |
| 17 | B | 0.15 | | | 235 | 72 |
| 18 | B | 0.20 | | | 257 | 142 |
| 19 | B | | 0.05 | | 238 | 81 |
| 20 | B | | 0.10 | 2,426 | 2,745 | 186 |
| 21 | C | | | | 219 | |
| 22 | C | | 0.10 | 229 | | |
| 23 | D | | | | 230 | 64 |
| 24 | D | 0.05 | | 274 | | 84 |
| 25 | D | | 0.075 | | | 195 |
| 26 | D | | 0.1 | | | 800 |

EXAMPLE 2

To about 1 pound of unsubstituted linear plastic polyethylene powder was added 6.81 grams of tert-butyl perbenzoate and the two ingredients were intimately mixed in a blender. The resulting mixture was then added to 19 pounds of linear plastic polyethylene powder and thoroughly mixed therewith so that 20 pounds of polyethylene containing 6.81 grams of uniformly distributed tert-butyl perbenzoate was obtained. The mixture contained 0.075 percent peroxide.

A portion (15 pounds) of this uncross-linked material, having a ZST at 250° C. of 60 was then fed into an extruder. After the first extrusion at 268° C. the ZST at 250° C. of the partially cross-linked material was 110. To the partially cross-linked material enough concentrate was added to bring peroxide percent to 0.1; it was then re-extruded through a die at 268° C. The re-extruded material was then completely cross-linked and stabilized and the ZST at 250° C. was 160.

The cross-linked polymers in the following examples shown in Table I were prepared according to the method The creep behavior of the cross-linked unsubstituted linear polyethylene containing 0.5 weight percent of di-t-butyl peroxide as compared with uncross-linked linear polyethylene (Marlex 50) is illustrated in the examples in Table III below.

Table III

| Example | Polymer | Temperature, °F. | Load, p.s.i.g. | Failure |
|---|---|---|---|---|
| 27 | Marlex 50 | 120 | 750 | Less than 100 hours. |
| 28 | X-linked | 120 | 700 | More than 4 months. |
| 29 | do | 120 | 935 | 1,400 hours. |
| 30 | Marlex 50 | 120 | 1,180 | Less than 24 hours. |
| 31 | X-linked | 120 | 1,184 | 400 hours. |

The stress cracking of the cross-linked unsubstituted linear polyethylene (Marlex 50) as compared with uncross-linked linear polyethylene (Marlex 50) submerged in the detergent, Igepal (nonyl phenolpolyethylene oxide) at 50° C. is illustrated in the examples of Table IV below. In each case 100 weight percent of unsubstituted linear polyethylene was employed.

Table IV

| Example | Polyethylene Sample | Weight percent di-t-butyl Peroxide | Weight percent t-butyl Perbenzoate | Hours Required for 50% Failure |
|---|---|---|---|---|
| 32 | E | | | 6 |
| 33 | E | 0.10 | | 26 |
| 34 | F | | | 6 |
| 35 | F | | 0.075 | 35 |
| 36 | F | | 0.10 | 69 |

EXAMPLES SHOWING THE EFFECT OF FILLERS IN THE CROSS-LINKING MIXTURE

Seven samples containing linear polyethylene (Marlex 5005) and a peroxide cross-linking agent were prepared and the composition of these samples reported in following Table V. The cross-linking agents employed in these samples were di-cumyl peroxide (Di-Cup 40) and di-tert-butyl peroxide (Varox).

Marlex (70 grams in each case) was placed in a two-roll rubber mill having a mill roll ratio of 1:1.4 wherein the polyethylene was banded on the mill at a temperature of 150° C. The mill was then cooled and the fillers and/or peroxide cross-linking agents added and milled to a uniform composition. The mill temperature during the incorporation of the peroxide was 137° C. In each case, the amount of peroxide added was a percent based in the weight of Marlex, whereas the amount of filler added in samples 1, 2 and 3 was 30 grams.

Table V
COMPOSITION OF SAMPLES

| | 1 | 2 | 3 | 4 | 5 | 6 | 7 |
|---|---|---|---|---|---|---|---|
| Marlex 5005 | 70 | 70 | 70 | 70 | 70 | 70 | 70 |
| Di-cumyl peroxide | 0.5 | 0.5 | | 0.5 | | | |
| Di-tert-butyl peroxide | | | 0.5 | | 0.5 | 0.1 | 0.05 |
| Alumina (C-730) | 30 | | | | | | |
| Carbon Black (P-33) | | 30 | | | | | |
| Calcium silicate (Silene EF) | | | 30 | | | | |

Each of the above samples was cross-linked by pressing into a sheet for 30 minutes under 1,000 p.s.i. at the curing temperatures reported in following Table VI. The tensile strength and percent elongation of each sample was measured at 75° F. according to ASTM Standard (D412–51T) and the results of these tests for a corresponding cure temperature are given in Table VI. The tensile strength of Marlex 5005 is 2950 and the percent elongation is 510. The numbers heading each of the columns in Table VI correspond to the sample numbers reported in Table V.

Table VI
TENSILE STRENGTH

| | 1 | 2 | 3 | 4 | 5 | 6 | 7 |
|---|---|---|---|---|---|---|---|
| Cure Temperature, °C.: | | | | | | | |
| 175 | 2,830 | 3,150 | 3,620 | | 4,140 | 2,860 | 2,950 |
| 200 | 1,430 | 2,860 | 2,920 | | 4,230 | 4,000 | 3,350 |
| 225 | | | | 2,550 | 2,950 | 3,048 | |
| 250 | | | | 2,590 | | | |

PERCENT ELONGATION

| | 1 | 2 | 3 | 4 | 5 | 6 | 7 |
|---|---|---|---|---|---|---|---|
| Cure Temperature, °C.: | | | | | | | |
| 175 | 170 | 30 | 20 | | 570 | 640 | 590 | 800 |
| 200 | 20 | 70 | 30 | | | 630 | 1,050 | |
| 225 | | | | 580 | 800 | | |
| 250 | | | | | | 920 | 790 |

In Table VI above, the percent elongation which was not measured for sample 4 at a curing temperature of 200° C. can be estimated to be between the values given and measured for sample 4 cured at 175° C. and at 225° C.

EXAMPLES SHOWING THE EFFECT OF CROSS-LINKING WITH OXYGEN

In addition to the above evaluation, the following properties were determined for a sample of Marlex 5005 which had been cross-linked with oxygen as the cross-linking agent in place of the peroxide.

Two oxygen-cross-linked polyethylene samples were prepared, namely A and B. Sample A was a milled polyethylene sheet which had been exposed to 50 p.s.i. of oxygen at 130° C. for 30 minutes and then cured for 30 minutes at 150° C. Sample B comprised polyethylene pellets which had been exposed to 50 p.s.i. of oxygen at 130° C. for 30 minutes and then cured for 30 minutes at 150° C. A novel product having high tensile strength and high percent elongation was obtained as shown in Table VII below.

Table VII
PROPERTIES OF THE PRODUCT OBTAINED FROM CROSS-LINKING MARLEX WITH OXYGEN

| | A | B |
|---|---|---|
| Tensile strength, p.s.i. | 4,050 | 3,960 |
| 100% Modulus | 3,410 | 2,960 |
| 200% Modulus | 3,410 | 2,960 |
| 300% Modulus | 3,410 | 2,960 |
| 400% Modulus | 3,410 | 2,960 |
| Percent Elongation | 1,150 | 1,050 |

The above .08 mil sheets of oxygen-cross-linked Marlex could be easily bent or flexed by hand, and the Modulus measurements indicate that the products are classified as flexible.

EXAMPLE SHOWING THE EFFECT OF FILLERS ON SHORE HARDNESS

Samples 1, 2, 4, 5 and 7 were subjected to Shore A hardness tests. The results of these findings at various cure temperatures are reported in Table VIII.

Table VIII

| | 1 | 2 | 4 | 5 | 7 |
|---|---|---|---|---|---|
| Cure Temperature: | | | | | |
| 160 | 96 | 196 | 96 | 99 | 98 |
| 175 | 96 | 96 | 97 | 99 | 98 |
| 200 | 95 | 92 | | 99 | |
| 225 | | | 98 | 99 | |
| 250 | | | 98 | | 98 |

Two additional samples 8 and 9 were prepared according to the procedure set forth for the above samples, except that in sample 8, 5 percent by weight of di-tert-butyl peroxide was employed as the cross-linking agent and in sample 9, 2 percent by weight of di-tert-butyl peroxide was added as the cross-linking agent. Sample 8 was found to have a Shore hardness of 98 for cure temperatures of 160° C., 175° C. and 200° C., and sample 9 was found to have a Shore hardness of 94 at 160° C., 98 at 175° C., 98 at 200° C., and 100 at 250° C. The original linear polymer (Marlex 5005) has a Shore hardness of 98. Thus, it is shown that samples cross-linked with fillers show a marked decrease in Shore hardness, whereas, the unfilled cross-linked linear polyethylene, in most cases, retains the same degree of hardness and, in some instances, achieves an even greater degree of hardness.

It is to be understood without departing from the scope of this invention that any of the other previously described peroxy compounds, particularly the organic peroxy compounds, for example diethyl peroxide, perbenzoic acid and tert-butyl peracetate, can be reacted with a normally solid, linear polyethylene to produce a cross-linked polymer having improved properties.

The cross-linked polymers of this invention have improved ZST values, increased percent elongation, high tensile strength, good thermal stability up to about 300°

C. and because of the marked reduction and in some cases the elimination of shrinkage, these polymers are particularly suited for molding purposes and can be extruded into piping and tubing. The plastic products of this invention can be intricately molded into sterilizable containers and equipment such as, fire extinguisher nozzles, floats, funnels, syringes, bottles, medical kits, die sets, drafting equipment cases, O-rings, valves, safety shields, etc. Films and coatings produced from the cross-linked polyethylene plastics have unusual tensile strength, toughness, and impact properties. Their resistance to penetration by moisture, corrosive gases and most solvents make them valuable as wire insulation, protective coatings for electrical equipment, such as wire coating and the like. Other applications for the improved cross-linked linear polyethylene product of this invention include protective coverings such as tarpons, etc., paper coating, phonograph records, toys, mixing bowls, canisters, cigarette packages, etc. When the solid wax-like polyethylene is cross-linked by the process herein described the resulting product having improved chemical resistance and lower solubility is useful in linings and packaging.

This invention relates to the cross-linking of a normally solid linear polyethylene with a peroxy cross-linking agent in the absence of a filler by a process which comprises uniformly admixing a peroxy compound with a normally solid linear polyethylene and permitting the polymer to cross-link to the desired ZST at a temperature between about 175° C. and about 250° C.

The invention also relates to the cross-linking of a normally solid linear polyethylene with oxygen or air by a process which comprises heating the polyethylene to a temperature below its transition temperature in an atmosphere of the cross-linking agent and then reheating the polyethylene in an atmosphere of the cross-linking agent at a temperature above its transition temperature to produce a flexible product.

Having thus described my invention I claim:

1. A method which comprises cross-linking linear polyethylene having a density of at least 0.93 g./cc. with a cross-linking agent selected from the group consisting of oxygen and air by heating the linear polyethylene below its transition temperature in an atmosphere of the cross-linking agent and then reheating the cross-linked polyethylene to a temperature above its transition temperature to produce a flexible product.

2. A method which comprises cross-linking a mixture consisting essentially of linear polyethylene having a density of between about 0.93 g./cc. and about 0.97 g./cc. and a substance selected from the group consisting of molecular oxygen and air at a temperature of from about 120° C. to below about 150° C. to produce a brittle polymer and reheating the cross-linked polymer to a temperature above the transition temperature of the polymer to produce a flexible polymer having high heat stability up to 250° C. and increased ZST.

3. A method which comprises cross-linking a mixture consisting essentially of linear polyethylene having a density of between 0.93 and about 0.97 g./cc. and air at a temperature of about 120° C. to produce a brittle polymer, reheating the brittle polymer at about 150° C. until it becomes transparent and cooling the resulting cross-linked polymer to produce a translucent flexible polyethylene having heat stability up to 260° C. and an increased ZST.

4. A method which comprises forming a mixture consisting essentially of a normally solid linear polyethylene having a density between 0.93 g./cc. and about 0.97 g./cc. and a cross-linking agent comprising an organic peroxy compound containing between 4 and 24 carbon atoms in an amount between about 0.02 and about 10 weight percent based on 100 weight percent of the polyethylene; uniformly admixing the cross-linking agent and the polyethylene by passing polyethylene powder through a partial vacuum chamber containing the organic peroxy vapors at a lower temperature than the vapors and permitting the peroxy vapors to condense on the polymeric powder and cross-linking the mixture thus formed at a temperature of between about 175° C. and about 225° C.

5. A method which comprises forming a mixture consisting essentially of normally solid linear polyethylene particles having a density of at least 0.93 g./cc. and a peroxy cross-linking agent in an amount of at least about 0.01 percent by weight based on 100 percent by weight of the polyethylene in a partial vacuum chamber; permitting the peroxy compound, maintained as a vapor at a higher temperature than the polyethylene, to condense on the surface of the polyethylene particles; and cross-linking the polyethylene particles with peroxy compound deposited thereon at a temperature of between about 175° C. and about 255° C.

6. A method which comprises cross-linking linear polyethylene having a density of at least 0.93 g./cc. with air as a cross-linking agent, by heating the linear polyethylene below its transition temperature in air to produce a brittle polymer; reheating the brittle polymer until it becomes transparent and cooling the resulting cross-linked polymer to obtain a translucent, flexible product having heat stability up to 250° C. and an increased ZST.

7. The product of the process of claim 1.

References Cited by the Examiner

UNITED STATES PATENTS

| 2,777,749 | 1/1957 | Young | 8—111 |
|---|---|---|---|
| 2,888,424 | 5/1959 | Precopio et al. | 260—94.9 |
| 3,079,370 | 2/1963 | Precopio et al. | 260—94.9 |

FOREIGN PATENTS 581,279   10/1946   Great Britain.

JOSEPH L. SCHOFER, *Primary Examiner.*